POTENTIOMETER DEVICE

Original Filed Sept. 8, 1951 2 Sheets-Sheet 1

INVENTORS.
MYRON A. COLER &
ARNOLD S. LOUIS
By Leonard H. King
Agent

INVENTORS.
MYRON A. COLER &
ARNOLD S. LOUIS
By Leonard H. King
Agent

United States Patent Office

Re. 25,479

Patented Nov. 12, 1963

25,479

POTENTIOMETER DEVICE

Myron A. Coler, Scarsdale, and Arnold S. Louis, Hastings-on-Hudson, N.Y., assignors, by direct and mesne assignments, to Markite Corporation, New York, N.Y., a corporation of New Jersey Original No. 2,700,719, dated Jan. 25, 1955, Ser. No. 245,672, Sept. 8, 1951. Application for reissue Nov. 17, 1961, Ser. No. 154,102

15 Claims. (Cl. 338—162)

Matter enclosed in heavy brackets [ ] appears in the original patent but forms no part of this reissue specification; matter printed in italics indicates the additions made by reissue.

This invention relates to variable resistance devices and methods of making same.

Conventional molded composition potentiometer devices are generally not suitable for use in applications requiring accuracy such as resolvers and other computer devices in which a given shaft rotation produces a corresponding change in output voltage of a potentiometer coupled to the shaft.

It is customary to obtain the required accuracy by utilizing a long metal wire of small cross-sectional area as the resistance element. In one practical embodiment such a long wire is wound on an insulated core which is in turn formed into a helix along which a movable probe is positioned to provide a variable control means. A less expensive and more common device utilizes closely spaced but separated turns of the wire on an insulating card with a probe moving from turn to turn. Both of these forms have the undesirable characteristic that a stepwise variation in resistance is obtained. Further, movement of the probe from turn to turn often gives rise to objectionable noise in the controlled circuit. When low total resistance is desired, resolution suffers because of the necessity of using but a few turns of heavy wire. The small diameter of very high resistance wire often results in poor wear characteristics in potentiometers of high resistance. A serious disadvantage is the high susceptibility of both of these types of multiple turn unit to inductive pickup of extraneous electrical signals. Further, their use at very high frequencies is limited by their inductance.

It is apparent that conventional composition potentiometers eliminate many of the stated disadvantages of the metal wire types. However, a primary objection to the use of the conventional composition type of potentiometer is poor uniformity; for example, with a potential applied to the fixed terminals, potential measurements made between a fixed terminal and the variable arm terminal will generally show the voltage does not vary uniformly with changes in arm position. Such non-uniformity results from variations in cross-sectional area and many other reasons which need not be discussed here. Suffice it to say, however, that the present invention discloses means and apparatus to compensate for such irregularities thus making it practical to utilize molded composition resistance devices for precision applications.

Factors contiributing to noise and inaccuracy in conventional composition variable resistance elements are lack of precise definition of the path of the moving contact, erratic behavior of the moving contact and distributed field effects. Thus, it has been found that a broad moving contact riding on a flat surface tends to touch the resistive material with different parts of the contact at different times because it is nearly impossible to machine a broad contact and a flat surface so that the two always make contact in the same fashion. The slightest irregularity in shaft alignment or the intrusion of a speck of dust will cause the contact to ride at different points or over different proportions of its length. It has been found that use of a point type contact tends to increase the inherent noise level. Also, it is a characteristic of materials, which have high specific resistivities compared with ordinary metals, that a point contact applied to a comparatively large surface experiences a high contact resistance by reason of the concentration of current flow near the point. The greater the specific resistance of the composition the more serious is this effect.

By contrast, it has been found advantageous to make the resistance material with a cross-sectional shape such that the contact area is small compared to the cross-sectional area. Advantageously, this shape is that of a triangle or a triangle with a rounded apex. Such a "track" can be more accurately and unequivocally located with reference to the mechanism which moves the contact. If the moving contact is long and narrow, say a piece of wire and having a hardness chosen close to that of the resistance material, the location and quality of the contact will not vary appreciably with moderate disturbances of the mechanism and the intrusion of dust will have a comparatively minor effect. It has been found that the track of this invention under comparable contact conditions, provides lower contact resistance than a flat resistance element of equal total resistance. Furthermore, the tapered track shape is adapted to making elements of comparatively small cross-section. It is preferred that the cross-section of potentiometers of this invention be held to a practical minimum. Thereby, a material of comparatively low specific resistance can be used to make a track of a given length and total resistance. In turn, the contact resistance then falls within a more desirable range.

The cooperation of the various advantages cited above achieves the surprising result that the variable resistors and potentiometers of this invention, while having very small contact areas, are more accurate and less noisy than conventional prior art products.

Accordingly, it is an object of this invention to provide a variable resistance device having a resistance that varies accurately in a predetermined fashion with a change of control setting.

It is a particular object of this invention to provide an improved method of molding resistance devices.

Still another object of this invention is to provide a variable resistance device which combines the advantages of good linearity and high resistance with long wear.

Still a further object of this invention is to provide a low noise variable resistance device.

It is also an object of this invention to provide a method for improving the uniformity of composition resistance elements.

A particular object is to provide a molded composition potentiometer contact track having a preferred contact.

It is still another object of this invention to provide a precision potentiometer which may be manufactured at a relatively low cost.

While it is possible to mold variable resistors of this invention with considerable accuracy, it has been found that their accuracy can be still further improved or predeterminable variations in functions achieved in the following manner. If a particular region of a relatively long resistance element has a non-uniform area of low resistivity, this may be remedied by removing conductive material. The effect of removing a given quantity from an area has been found to diminish with increasing distance of the area from the contact surface. Similarly, an area having too high a resistance may be corrected by applying conductive material at the area of high resistance. This may be fine silver powder dispersed in an organic binder. A more modest correction may be made by using a somewhat more resistive material such as a conductive carbon coating. Accordingly, a structure is provided which permits removal or addition of material to compensate resistance without disturbing the contact surface. In addition, the procedure of machining portions of a track of the type herein described, said portions being remote from the contact area, may be used to correct a track which has less than a desired resistance but is satisfactory as to linearity. This is done by taking a uniform cut along the entire length of a track, for instance with a milling cutter. In a similar fashion, a non-uniform cut, say a tapered cut, may be made to produce an element having a functional characteristic.

This invention may best be understood by reference to the accompanying drawings, wherein FIGURE 1 is a plan view of a typical potentiometer of this invention.

Figure 1:
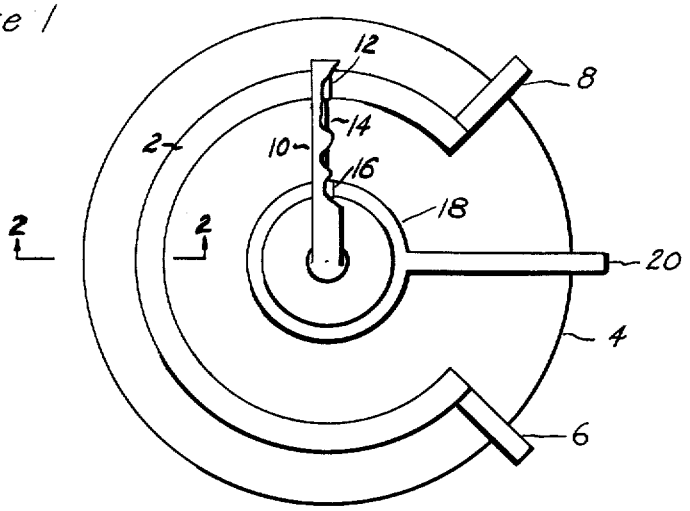
Figure 2:
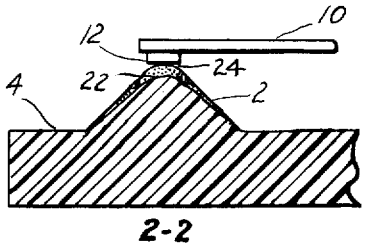
FIGURE 2 is an enlarged cross-sectional view of the resistance element of the potentiometer of FIGURE 1.

The potentiometer shown in FIGURE 1 utilizes a resistance element 2 which is constructed in accordance with this invention. The resistance element 2 is shown comolded to an insulating base 4. Terminals 6 and 8 are shown connected to the resistance element 2. A radial arm 10 carries a movable contactor 12 which makes contact with resistance element 2, and by means of a conducting strip 14 and sliding contact 16, in turn makes an electrical connection through a metal ring 18 to terminal 20. The form of the resistance element 2 is shown in FIGURE 2, the element 2 being bonded to the insulating base 4 along the line 22. It is to be noted that the element is molded in the form of a triangle having a rounded apex forming the contact track 24 against which the sliding contact 12 is positioned. The rounded apex form has been found to be advantageous from the viewpoint of wear resistance and low noise.

Figure 3:
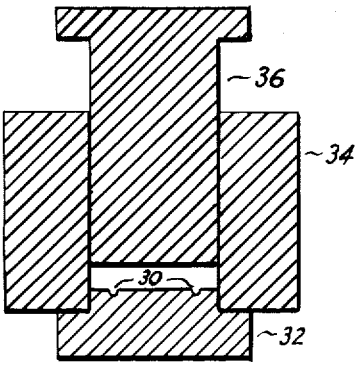
FIGURE 3 shows in elevation a cross-section of a simple compression mold for molding resistance units.

The simple piston mold shown in FIGURE 3 may be used to make potentiometers in accordance with this invention. A resistance material is filled into mold recess 30 of lower mold portion 32 and the excess is removed. Mold collar 34 is inserted over lower mold 32 and the mold is charged with an insulating molding powder for the base. Piston 36 is inserted and the mold is then subjected to the combination of heat and pressure suitable for molding the particular resistance and insulating materials used.

This method of filling the mold recess with conductive material, removing the excess, and then adding the insulating molding powder permits the use of the insulating powder as a deformable piston to compress the conductive material into a portion of the mold groove. As compared with the case wherein after molding the entire groove is filled with molded resistive material this procedure permits the use of material having a comparatively low resistance when making a track. As pointed out above, decrease in contact resistance and noise result. Furthermore, the even filling of the groove with molding powder assures that the resistive material will be evenly distributed along the groove, hence improving the linearity of the resulting track.

Figure 4:
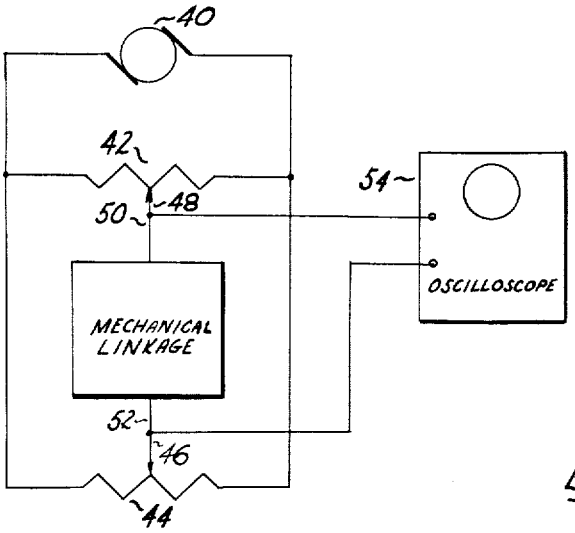
FIGURE 4 represents diagrammatically an electrical circuit for testing the resistance element.

One type of apparatus for measuring the linearity of potentiometers is shown schematically in FIGURE 4. The output of a 400 cycle per second signal generator 40 is applied to a standard potentiometer 42 and a potentiometer 44 which is under test. A null indicating instrument which is preferably an oscilloscope but which may be a sensitive meter is connected to variable contacts 46 and 48 so as to indicate the magnitude and sign of any potential difference between said contacts. The contacts 46 and 48 are mounted on movable arms 50, 52 which are mechanically linked so that corresponding positions on potentiometers 42 and 44 are simultaneously contacted. Any deviation of resistance of potentiometer 44 as compared to the standard potentiometer 42 will result in a voltage unbalance which would appear as a pulse on the oscilloscope 54. A correction may then be applied to the faulty area of the resistance element so as to eliminate this voltage unbalance. If the resistance of the area is too low it is readily increased by removing a small amount of material as with a hand grinding tool. The effect of removing a given volume of resistance material varies in an inverse fashion with the distance of the area from the contact point. Thus a relatively large change of resistance may be obtained by removing material from an area 62 (shown in FIGURE 5) or a relatively slight change by removing an area 64 remote from the contact track 66.

Figure 5:
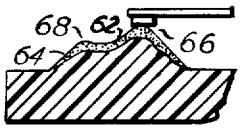
FIGURE 5 shows an enlarged cross-sectional side view of a portion of the preferred resistance element.

The construction shown in FIGURE 5 is particularly well adapted to take advantage of this phenomenon. All or part of the protruding ridge 68 may be removed to increase resistance without significantly structurally weakening the contact track.

A particular variable resistor was made by molding a flat topped ring of moldable resistance material of the type comprising a synthetic resin and acetylene black, and having a specific resistivity of about 50 ohm centimeters. The ring was about 2 inches in internal diameter, ⅛ inch wide and ¼ inch high. The ring, having a resistance of about 3000 ohms end to end, was tested for linearity substantially as described above with a contact consisting of a small carbon rod. The maximum departure from linearity was found to be ±5%.

A second potentiometer was made in the same mold and with the same overall dimensions. In this case the upper (contact) part of the ring, about 1/16 inch thick, was made of a plastic similar to that of the first potentiometer but having a specific resistance of about 13 ohm centimeters. The remainder of the molding was an insulating plastic comolded with the resistance material. The ring showed a resistance, end to end, of about 3000 ohms. When tested for linearity it showed a maximum departure from linearity of ±2.5%. Both of the above potentiometers showed considerable irregularity of contact behavior with accompanying noise.

A third potentiometer was made in a mold of the type described herein. The track of the potentiometer was about 2 inches in diameter at its peak. The track was about 0.035 inch wide at its base and 0.040 inch high with a rounded top. The conductive material was of the same type as before but had a specific resistance of about 2 ohm centimeters. The track had a resistance, end to end, of about 3000 ohms. When tested for linearity it showed a maximum deviation of less than 0.6%. The contact behavior was smooth and with much less noise than was evidenced by either of the other two potentiometers.

In a fourth case it was desired to mold a rectilinear potentiometer track 10 inches long having a resistance of 19,800 to 21,000 ohms. A track, 0.025 inch wide and 0.030 inch high with a rounded top, was molded from the same type of resistive material mentioned above but with a specific resistance of 3.5 ohm centimeters. As molded the track had the required linearity but a resistance of 18,300 ohms. The track was set up in a milling machine and an inward cut of 0.003 inch was made on one side of the track near its base. The resistance of the track was then 20,200 ohms. The linearity was approximately the same as before.

Within limits specified below it is desirable that the radius of curvature of the contact portion of the track be as large as possible. The reasons are not wholly clear but it has been found that the contact resistance is smaller and more constant the larger this radius of curvature. In keeping with considerations outlined above, however, it is undesirable for the radius of curvature to be so large that a bar contact has the possibility of touching at more than one point. It has been found by experiment that the radius of curvature of the contact area of the cross-section of a track should be between 0.01 and 0.5 inch, preferably between 0.02 and 0.25 inch.

It has been found that improved characteristics are obtained through the use of resistance materials having low specific resistances. In particular, specific resistivities below 10 ohm centimeters are preferred. Specific resistivities below 100 ohm centimeters are desirable. The use of such relatively low specific resistance materials necessitate, for most total resistance ranges, the use of elements of low cross-sectional area.

The element and method of making same discussed earlier permit the achievement of the small cross-section required.

Suitable materials for the practice of this invention include moldable and castable conductive plastic materials, conductive hard rubbers, and conductive ceramics.

While the variable resistor elements of this invention are best and most easily formed by a molding operation, they may, of course, be shaped in other fashions, as by casting, machining, etc.

Although only tracks of straight and circular path shape have been discussed, this invention is equally useful in conjunction with tracks of any path shape or which are rendered non-linear by variation of cross-section or use of several materials of different specific resistivities in series.

It is understood that in the claims appended hereafter it is our intention to cover all changes and modifications of the example of the invention herein chosen for purposes of disclosure which do not constitute departures from the spirit and scope of the invention.

We claim:

[1. For use in potentiometer a composition resistance element, said element having only a single convex curved contact face adapted to be tangentially engaged by a movable contactor.]

[2. In a potentiometer, a pair of spaced fixed contacts, a body of resistance material interposed between and in electrical contact with said fixed contacts to provide a principal electrical path between said contacts, said body having a single contact face adapted to be engaged by a movable contactor, said contact face being disposed in the direction of said principal electrical path and being further characterized by a convex curved edge, and a movable contactor in electrical contact only with said single contact face.]

[3. The potentiometer of claim 2 in which the resistance material has a specific resistivity less than 100 ohm centimeters.]

4. The potentiometer of claim 11 in which the resistance material has a specific resistivity less than 100 ohm centimeters.

5. The potentiometer of claim 11 wherein the radius of curvature of said contact face is within the range of 0.01 to 0.5 inch.

6. The method of molding a resistance element of relatively small cross-section including the steps of *completely* filling a *single* recessed mold groove with molding powder adapted to form a conductive *plastic* mass when molded, adding insulating molding powder and simultaneously molding both of said powders.

7. A variable resistance device comprising an insulating base, a resistance element of the molded composition type having a single convex curved contact making surface *integrally comolded* [attached] to said base so as to permit said curved surface to be exposed, a movable contact adapted to engage only said single curved surface and fixed terminals [in contact with] *electrically connected to* said element.

8. The device of claim 7 wherein said contact making surface has a radius of curvature between 0.01 and 0.5 inch.

9. The device of claim 7 wherein the specific resistivity of said resistance element is less than 100 ohm centimeters.

10. In a potentiometer, a pair of spaced fixed contacts, a body of resistance material interposed between and in electrical contact with said fixed contacts to provide a principal electrical path between said contacts, said body having a single contact face adapted to be engaged by a movable contactor, said contact face being disposed in the direction of said principal electrical path and being further characterized by a convex curved edge, and a long, narrow, movable contactor adapted to move relative to said contact face in electrical contact only with said single face and having its long dimension transverse to the electrical path.

11. In a potentiometer an insulating plastic base, a pair of spaced fixed contacts, a body of resistance material interposed between and in electrical contact with said fixed contacts and comolded to said base, said body having a single convex curved contact face [adapted to be] tangentially engaged by a movable contactor in electrical contact only with said single contact face, and an exposed face of said body adapted for resistance correction.

*12. The method of comolding, (1) a raised composition resistance element of relatively small cross section and having a convex curved crown, and (2) an insulator plastic supporting member, employing a mold provided with a single recessed mold groove having a concave bottom portion, including the steps of:*

*(a) completely filling said groove with a first molding powder adapted to form a conductive mass when molded;*

*(b) charging said mold with an insulator molding powder adapted to form an insulator when molded; and*

*(c) subjecting said first molding powder and said insulator molding powder to a combination of heat and pressure suitable for molding said first molding powder and said insulator molding powder.*

*13. The method of claim 12 wherein said concave groove bottom has a radius of curvature of between 0.01 and 0.5 inch.*

*14. In a potentiometer, a pair of spaced fixed contacts, a body of resistance material interposed between and in electrical contact with said fixed contacts to provide a principal electrical path between said contacts, said body having a single contact face adapted to be engaged by a movable contactor, said contact face being disposed in the direction of said principal electrical path and being further characterized by a convex curved edge, and an elongated rod shaped movable contactor adapted to move relative to said contact face with its rounded edge in electrical contact with said single face and having its long dimension transverse to the electrical path.*

*15. A potentiometer comprising:*

*(a) an insulator plastic supporting plate provided with an integral insulator plastic ridge portion;*

*(b) a crown of resistive synthetic resin composition secured to said ridge portion, said crown having a convex curved apex;*

*(c) a pair of fixed contacts connected to said crown at spaced points thereof;*

*(d) a movable elongated contactor arranged to traverse only said apex between said spaced points with its long dimension transverse to the path between said fixed contacts; and*

*(e) means to connect said elongated contactor to an external circuit.*

*16. The potentiometer of claim 15 wherein said crown has a specific resistivity of less than 100 ohm centimeters.*

*17. The potentiometer of claim 15 wherein said apex has a radius of curvature of between 0.01 and 0.5 inch.*

*18. The potentiometer of claim 15 wherein said contactor is formed of wire.*

References Cited in the file of this patent or the original patent

UNITED STATES PATENTS

| | | |
|---|---|---|
| 1,678,028 | Wiegand | July 24, 1928 |
| 1,950,750 | Ruben | Mar. 13, 1934 |
| 1,962,438 | Flanzer et al. | June 12, 1934 |
| 1,992,529 | Henry | Feb. 26, 1935 |
| 2,056,928 | Magdziarz | Oct. 6, 1936 |
| 2,082,980 | Schellenger | June 8, 1937 |
| 2,089,425 | Ragatz et al. | Aug. 10, 1937 |
| 2,169,594 | Schellenger | Aug. 15, 1939 |
| 2,267,954 | Schumacher | Dec. 30, 1941 |
| 2,269,136 | Tellkamp | Jan. 6, 1942 |
| 2,271,774 | Megow et al. | Feb. 3, 1942 |
| 2,302,564 | Megow et al. | Nov. 17, 1942 |
| 2,330,782 | Morelock | Sept. 28, 1943 |
| 2,368,327 | Rose | Jan. 30, 1945 |
| 2,368,717 | Marscher | Feb. 6, 1945 |
| 2,500,605 | De Lang | Mar. 14, 1950 |
| 2,514,682 | Tellkamp | July 11, 1950 |

FOREIGN PATENTS

| | | |
|---|---|---|
| 246,325 | Great Britain | Jan. 28, 1926 |